United States Patent [19]

Sakamoto et al.

[11] 4,239,423
[45] Dec. 16, 1980

[54] APPARATUS FOR HYDRAULICALLY TRANSPORTING PARTICULATE SOLID MATERIAL

[75] Inventors: Masakatsu Sakamoto, Matsudo; Kenji Uchida, Kashiwa; Isao Honma, Abiko; Yukishige Kamino, Ibaraki, all of Japan

[73] Assignee: Hitachi, Ltd., Japan

[21] Appl. No.: 22,948

[22] Filed: Mar. 22, 1979

[30] Foreign Application Priority Data

Mar. 24, 1978 [JP] Japan .................................. 53-33094

[51] Int. Cl.³ ............................................. B65G 53/30
[52] U.S. Cl. ..................................... 406/47; 406/109; 417/102
[58] Field of Search ..................... 406/47, 48, 96, 102, 406/104, 109; 417/92, 102, 103

[56] References Cited

U.S. PATENT DOCUMENTS

| 3,140,123 | 7/1964 | Bowen .................................. 406/109 |
| 3,556,682 | 1/1971 | Sakamoto et al. .................... 417/102 |
| 4,037,992 | 7/1977 | Uchida et al. ..................... 417/103 X |

*Primary Examiner*—Jeffrey V. Nase
*Attorney, Agent, or Firm*—Craig & Antonelli

[57] ABSTRACT

An apparatus including at least one horizontal feed pipe from which a mixture of liquid and particulate solid material to be transported is discharged into a high-pressure transport pipe by the action of a driving liquid delivered through a vertical pipe connected to the horizontal feed pipe to apply pressure to the mixture in the horizontal feed pipe through an intermediate liquid having a specific gravity lower than that of the mixture and higher than that of the driving liquid. Prior to initiation of an operation, the horizontal feed pipe and a lower portion of the vertical pipe below a float mounted therein are charged with the intermediate liquid and an upper portion of the vertical pipe above the float is charged with the driving liquid. Upon the mixture being delivered by a low-pressure mixture pump to the horizontal feed pipe, the intermediate liquid flows into the vertical pipe and raises the level of the float to return the driving liquid from the vertical pipe to its tank. Then, the driving liquid is delivered by a high-pressure driving liquid pump to the vertical pipe from which the intermediate liquid is forced into the horizontal feed pipe to thereby discharge the mixture from the latter into the high-pressure transport pipe, thereby transporting the particulate solid material to a predetermined destination. A mixture feeding device and an intermediate liquid feed device and their modifications are disclosed.

5 Claims, 5 Drawing Figures

APPARATUS FOR HYDRAULICALLY TRANSPORTING PARTICULATE SOLID MATERIAL

BACKGROUND OF THE INVENTION

This invention relates to an apparatus for hydraulically transporting particulate solid material, such as coal, limestone, earth and sand, etc.

In the field of hydraulic transportation of particulate solid material, various apparatus are known in which a mixture of water and particulate material to be transported or a solid-liquid mixture is charged into at least one feed pipe fluidly connected to a transport pipe through a valve and the solid-liquid mixture charged in the feed pipe is forced by a high-pressure driving liquid into the transport pipe to hydraulically transport the particlate solid material to a predetermined destination. Such apparatus for hydraulically transporting particulate solid material which are sometimes referred to as hydrohoists are disclosed, for example, in U.S. Pat. Nos. 3,449,013; 3,556,682; 4,145,087; and 4,164,359.

In the technical field referred to hereinabove, there are some problems that have not yet been solved by the prior art. More specifically, the longer the distance covered by the solid-liquid mixture transported through the transport pipe, the higher becomes the flow velocity of the mixture at its central portion near the center axis of the transport pipe and the lower becomes the flow rate of the mixture at its peripheral portion remote from the center axis of the transport pipe and near the inner wall surface thereof. Owing to this phenomenon, the portion of the body of the mixture which is near the boundary between the mixture and the high-pressure driving liquid or the trailing end portion of the body of the mixture in the feed pipe is delayed in its flow, with a result that the solid particles in the trailing end portion of the body of the mixture remains in the feed pipe. The residual solid particles in the feed pipe tend to be incorporated in the driving liquid when the latter is returned to its reservoir. The present practice for preventing incorporation of the residual solid particles in the returning driving liquid is to cause the trailing end of the body of the mixture to flow out of a valve mounted between the feed pipe and the transport pipe before such valve is closed. This practice has a disadvantage in that the driving liquid is drawn into the mixture to lower the concentration of the latter and reduce transportation efficiency. Experiments have shown that the amount of the driving liquid drawn into the mixture is no less than 20% of the mixture.

To obviate these disadvantages of the prior art, proposals have been made to transport particulate solid material by keeping the same suspended in a mother liquid of slurry which has a specific gravity higher than that of the driving liquid and lower than that of the particulate solid material. By this means, the delay in the flow of the trailing end portion of the body of the mixture which would otherwise occur can be prevented. However, the problem of large solid particles (over 2 mm in grain size) falling to and deposited on the bottom of the transport pipe is raised when the concentration of the mother liquid of slurry is lowered by the driving liquid in the feed pipe.

SUMMARY OF THE INVENTION

This invention has as its object the provision of a novel apparatus for hydraulically transporting particulate solid material which obviates the aforesaid disadvantages of the prior art.

The outstanding characteristics of this invention are that at least one horizontal feed pipe for temporarily storing therein a mixture of mother liquid and particulate solid material to be transported has fluidly connected at one end thereof a high-pressure mixture transport pipe and at the other end thereof a vertical pipe having a float elevationally mounted therein for permitting a high-pressure driving liquid to flow therethrough when supplied to the horizontal feed pipe and returned therefrom, that high-pressure driving liquid supply means and a driving liquid return pipe are each fluidly connected through a valve to the vertical pipe, and that an intermediate liquid having a specific gravity higher than that of the driving liquid and lower than that of the mixture is sealed in a lower portion of the vertical pipe and a portion of the horizontal feed pipe which is near the connection between the feed pipe and the vertical pipe.

DESCRIPTION OF THE PREFERRED EMBODIMENTS

Figure 1:
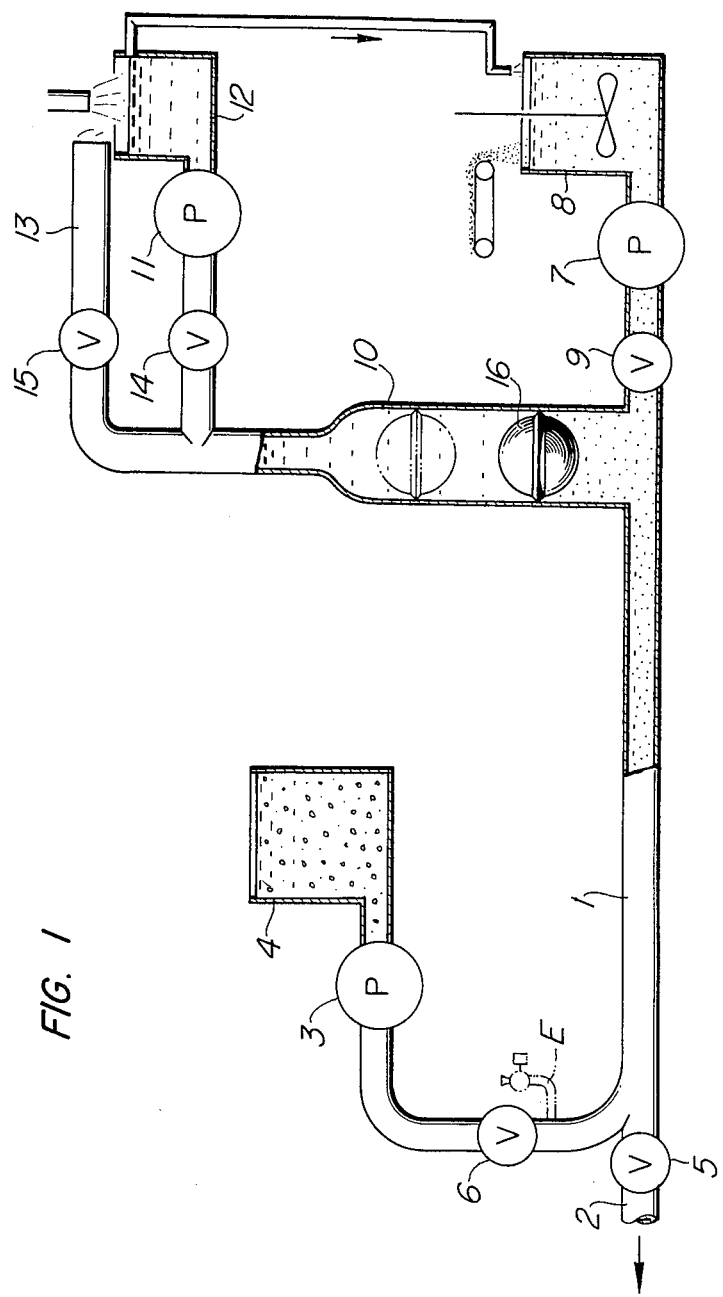
FIG. 1 is a schematic view of the apparatus for hydraulically transporting particulate solid material comprising one embodiment of the invention.

Embodiments of the invention will now be described by referring to the accompanying drawings. FIG. 1 shows one embodiment wherein a horizontal feed pipe 1 for temporarily storing therein a mixture of mother liquid and particulate solid material to be transported has a high-pressure mixture transport pipe 2 fluidly connected to its left end through a valve 5. A low-pressure mixture pump 3 is fluidly connected at its discharge end to the horizontal feed pipe 1 through a valve 6 and at its suction side to a mixture tank 4. An intermediate liquid pump 7 is mounted at the right end of the horizontal feed pipe 1 through a valve 9 and fluidly connected to an intermediate liquid tank 8 containing therein an intermediate liquid comprising water and microscopic solid particles (below 50µ in grain size) and having a specific gravity higher than that of clear water and lower than that of the mixture. In practice, the mother liquid of the mixture is most preferable to be identical with the intermediate liquid.

A vertical pipe 10 is fluidly connected at its lower end to the right end portion of the horizontal feed pipe 1 and at its upper end to a high-pressure driving liquid pump 11 and a driving liquid return pipe 13 through valves 14 and 15 respectively. The numeral 12 designates a tank for storing a driving liquid, which may be clear water, for example, connected to the suction side of the high-pressure driving liquid pump 11, and the numeral 16 designates a float arranged in the vertical pipe 10 and having a specific gravity selected such that the float 16 is located in the liquid-to-liquid interface formed by the driving liquid and the intermediate liquid in the vertical pipe 10 at all times and moves in elevational movement in the vertical pipe 10 as the liquid-to-liquid interface shifts its position, so that the float 16 has the function of keeping the driving liquid and the intermediate liquid from mixing with each other.

Prior to initiation of the operation of the system, the horizontal feed pipe 1 and a portion of the vertical pipe 10 below the float 16 are charged with the intermediate liquid, and a portion of the vertical pipe 10 above the float 16 is charged with the high-pressure driving liquid. Charging of the intermediate liquid into the feed pipe 1 and the lower portion of the vertical pipe 10 may be effected by venting air from the feed pipe 1 to outside through an air venting means E connected to a branch pipe of the horizontal feed pipe 1, for example, and charging of the driving liquid into the upper portion of the vertical pipe 10 may be effected by opening the valves 14 and 15. In this case, the air above the float 16 is vented through valve 15, and the driving liquid is charged into the upper portion of the vertical pipe 10 above the float 16 while the intermediate liquid is charged into the lower portion of the vertical pipe 16 below the float. It is to be understood that the invention is not limited to the aforesaid specific process of charging the driving liquid and the intermediate liquid, and that many other processes may be used to attain that end.

The embodiment constructed as aforesaid operates as follows. After the apparatus has been rendered ready for operation as aforesaid, the valves 6 and 15 are opened and the low-pressure mixture pump 3 is actuated to deliver the mixture from the mixture tank 4 to the horizontal feed pipe 1. Upon the mixture flowing into the horizontal feed pipe 1, the intermediate liquid in the pipe 1 is pushed backwardly by the mixture into the vertical pipe 10 because the valve 9 is closed. The entry of the intermediate liquid into the vertical pipe 10 raises the level of the intermediate liquid in the pipe 10, thereby raising the level of the float 16 located in the boundary between the intermediate liquid and the driving liquid. At the same time, the driving liquid located above the float 16 is returned to the driving liquid tank 12 through the valve 15 and driving liquid return pipe 13. This completes charging of the mixture into the horizontal feed pipe 1.

Then, the valves 6 and 15 are closed and the valves 5 and 14 are opened (valve 9 remains closed) and the high-pressure driving liquid pump 11 is actuated. As a result, the driving liquid is delivered from the tank 12 to the vertical pipe 10 and the intermediate liquid in the vertical pipe 10 is forced into the horizontal feed pipe 1. The entry of the intermediate liquid into the horizontal feed pipe 1 discharges the mixture from the latter into the high-pressure mixture transport pipe 2 through valve 5. The mixture discharged into the high-pressure transport pipe 2 is in contact at its trailing end with the intermediate liquid which has a specific gravity similar to that of the mixture because its specific gravity is higher than that of the driving liquid and lower than that of the mixture. Thus the delay in the flow of the trailing end portion of the mixture can be minimized as compared with the prior art in which the mixture is in contact at its trailing end with the driving liquid which is lower in specific gravity than the intermediate liquid. Consequently, the amount of the intermediate liquid finding its way into the transport pipe 2 before the valve 5 is closed is very small. Replenishing of the intermediate liquid has only to be effected when the accumulated amount of consumed intermediate liquid exceeds a predetermined level. Replenishing of the intermediate liquid is effected by closing the valves 5 and 14 and opening the valves 9 and 15 and by actuating the pump 7 to deliver the intermediate liquid from the tank 8 to the horizontal feed pipe 1 (or vertical pipe 10). Replenishing of the intermediate liquid is carried out when necessary, as aforesaid. Therefore, in normal practice, the valves 5 and 14 are closed and the valves 6 and 15 are opened after the mixture is discharged from the horizontal feed pipe 1 into the transport pipe 2. The aforesaid steps are repeated. It is to be understood that the apparatus according to the invention is not limited to the specific form in construction as described hereinabove.

In the embodiment shown and described hereinabove, the intermediate liquid pump 7 and the intermediate liquid tank 8 are connected to the right end of the horizontal feed pipe 1. It is to be understood that the tank 8 and pump 7 may be dispensed with, and that instead the intermediate liquid may be sealed in the lower portion of the vertical pipe 10 and a portion of the horizontal feed pipe 1 close to the connection between the feed pipe 1 and the vertical pipe 10 or at the right end portion of the pipe 1, in an amount which is slightly larger than the volume of the horizontal feed pipe 1. By this arrangement, the consumption of the intermediate liquid can be minimized and yet the same effects as achieved by the embodiment shown in FIG. 1 can be achieved.

Figure 2:
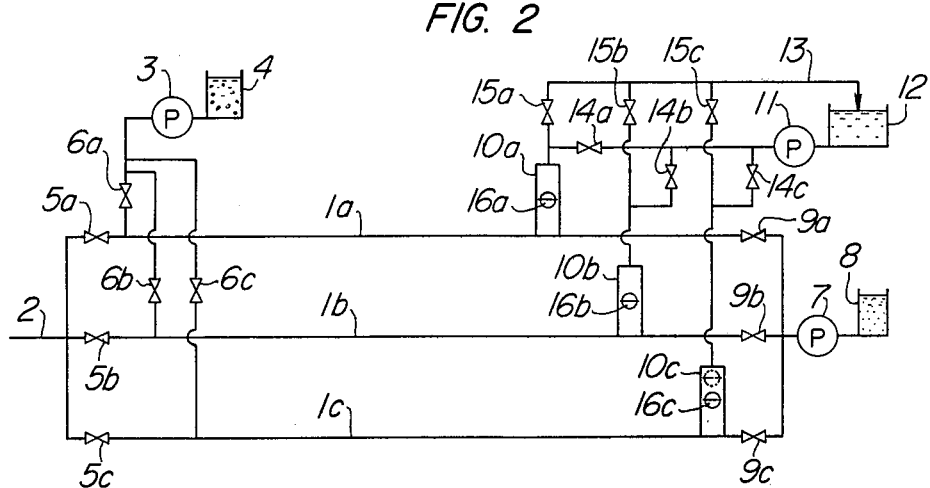
FIG. 2 is a systematic view of the apparatus similar to the apparatus shown in FIG. 1 but having a plurality of transport systems.

In the embodiment shown in FIG. 1, only one horizontal feed pipe 1 is connected to the high-pressure mixture transport pipe. In this case, discharge of the mixture into the transport pipe 2 from the feed pipe 1 is effected intermittently. If it is desired to discharge the mixture continuously, a plurality of horizontal feed pipes 1 should be provided. FIG. 2 shows a modification of the apparatus shown in FIG. 1 in which three horizontal feed pipes 1a, 1b and 1c are fluidly connected to the transport pipe 2 through the valves 5a, 5b and 5c respectively. In the modification shown in FIG. 2, the apparatus includes three independent transport systems which share the tanks 4, 12 and 8 and the pumps 3, 11 and 7, and in which operation of each transport system is controlled such that discharge of the mixture from the feed pipes 1a, 1b and 1c into the transport pipe 2 takes place successively in a predetermined order. In FIG. 2, parts similar to those shown in FIG. 1 are designated by adding subscripts a, b and c to the reference characters used in FIG. 1.

Figure 3:
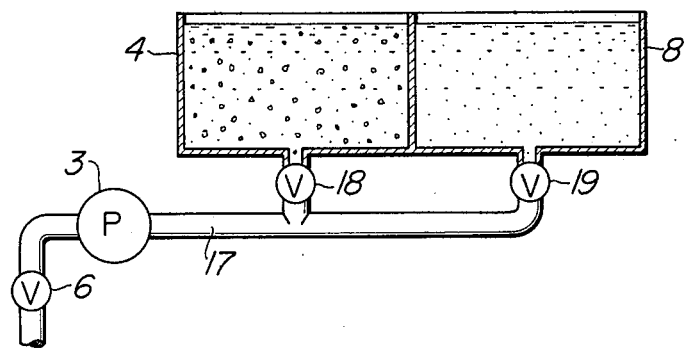
FIGS. 3 to 5 show modifications of means for supplying the mixture and the intermediate liquid.

In the embodiment shown in FIG. 1, the intermediate liquid tank 8 is fluidly connected to the right end of the horizontal feed pipe 1 through the intermediate liquid pump 7 and valve 9. The intermediate liquid tank 8 may be located adjacent the mixture tank 4, and the tanks 4 and 8 may be connected in parallel to a suction pipe 17 of the low-pressure mixture pump 3 through valves 18 and 19, respectively, as shown in FIG. 3. Other parts are similar in construction to those of the embodiment shown in FIG. 1.

In the embodiment shown in FIG. 3, valve 19 is opened to deliver the intermediate liquid by the low-pressure mixture pump 3 to the horizontal feed pipe 1 and the driving liquid is delivered to the upper portion of the vertical pipe 10 above the float 16, in preparation for performing an operation. In operation, valve 19 is closed and valve 18 is opened to deliver the mixture from the mixture tank 4 to the horizontal feed pipe 1. Delivery of the driving liquid and discharge of the mixture into the transport pipe 2 take place as described with reference to the embodiment shown in FIG. 1, so that the description thereof is omitted. In case there arises a scarcity of the intermediate liquid in the horizontal feed pipe 1 and the lower portion of the vertical pipe 10, valve 19 is opened to supply the intermediate liquid in any amount as required, prior to delivery of the mixture to the horizontal feed pile 1. The embodiment shown in FIG. 3 is simpler in construction than the embodiment shown in FIG. 1.

Figure 4:
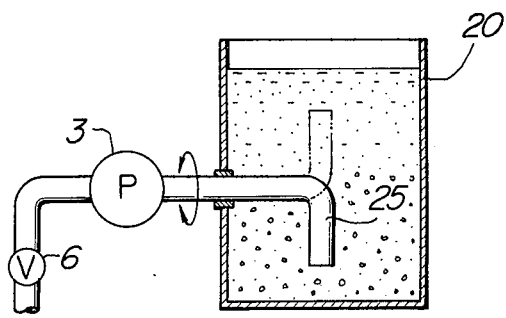

FIG. 4 shows an embodiment simpler in construction than the embodiment shown in FIG. 3. As shown, the suction pipe 25 is rotatably connected to the low-pressure mixture pump 3 and opens at its free end in a tank 20 which contains therein the mixture and the intermediate liquid. Since the mixture has a higher specific gravity than the intermediate liquid, the former is stored in the lower portion of the tank 20 and the latter is stored in the upper portion thereof.

Figure 5:
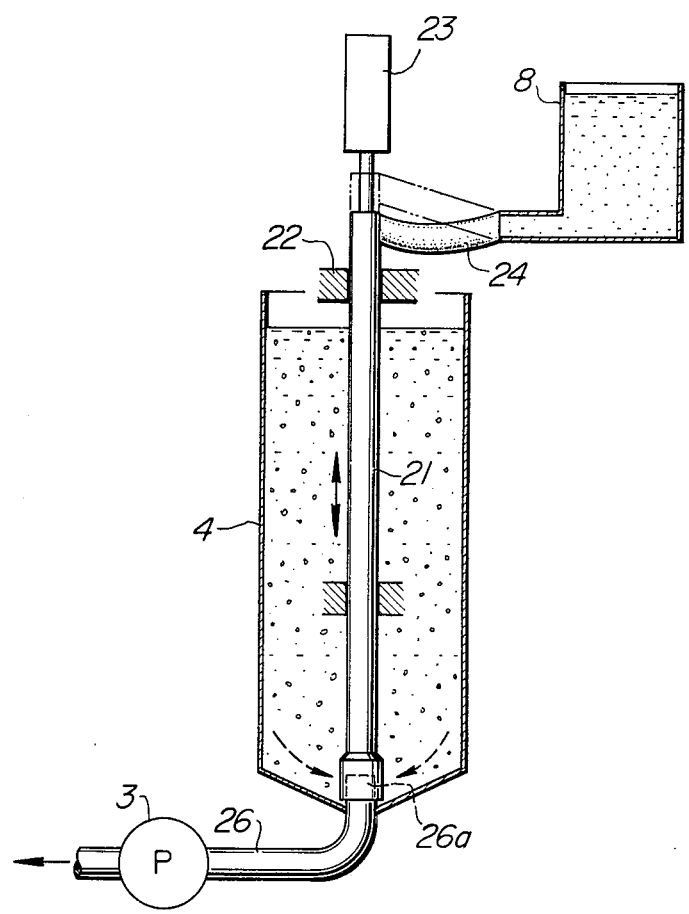

FIG. 5 shows still another embodiment in which the suction pipe 26 of the low-pressure mixture pump 3 includes an end portion 26a opening in the mixture tank 4, and a movable pipe 21 supported by a guide 22 and longitudinally moved by moving means 23 is detachably connected at its lower end to the end portion 26a of the suction pipe 26, the movable pipe 21 being connected at its upper end through a flexible pipe 24 to the intermediate liquid tank 8.

In the embodiment constructed as aforesaid, the intermediate liquid in the intermediate liquid tank 8 can be delivered to the horizontal feed pipe 1 through the low-pressure mixture pump 3 by moving the movable pipe 21 downwardly by actuating the moving means 23 and connecting the movable pipe 21 at its lower end to the end portion 26a of the suction pipe 26. Conversely, if the movable pipe 21 is moved upwardly by actuating the moving means 23 and releasing the movable pipe 21 from the end portion 26a of the suction pipe 26, it is possible to deliver the mixture from the mixture tank 4 to the horizontal feed pipe 1 by means of the low-pressure mixture pump 3. This embodiment offers the advantage that switching of suction pipe 26 between the intermediate liquid tank 8 and the mixture tank 4 can be effected in a short period of time.

The various embodiments of the invention described hereinabove offer the following advantages.

(1) In hydrohoists of the prior art, a mixture of particulate solid material to be transported and water is discharged from the feed pipe to the transport pipe by the action of a driving liquid which directly applies pressure to the mixture. The direct contact of the driving liquid which is clear water with the mixture has posed various problems including lowered concentration of the mixture and increased loss of power due to incorporation of the driving liquid in the mixture in an amount which is about 20% of the mixture. In this invention, an intermediate liquid is used to avoid direct contact between the mixture and the driving liquid, and this enables the incorporation of water in the mixture to be eliminated, thereby solving the aforesaid problems raised in the prior art.

(2) Difficulties have been encountered in hydrohoists of the prior art in effecting adjustments of timing for opening and closing the valves in accordance with the amount of particulate solid material to be transported. The present invention makes it possible to control timing for opening and closing the valves in accordance with the amount of the mixture through the float, each time the mixture is delivered to the feed pipe and discharged therefrom.

(3) Hydrohoists of the prior art have had the disadvantages that the concentration of the mixture is lowered due to incorporation of the driving liquid in the mixture and that large-size solid particles (over 2 mm in grain size) tend to be deposited on the bottom of the transport pipe. The present invention obviates these disadvantages and is capable of transporting solid particles of large-size (over 2 mm in grain size) over a long distance.

What is claimed is:

1. An apparatus for hydraulically transporting particulate solid material comprising:
   at least one horizontal feed pipe having at least two ends for temporarily storing a mixture of liquid and the particulate solid material to be transported;
   a high-pressure mixture transport pipe fluidly connected to one end of said horizontal feed pipe through a valve;
   low-pressure mixture feed means fluidly connected to the one end of said horizontal feed pipe through a valve;
   a vertical pipe fluidly connected at one end thereof to the other end of said horizontal feed pipe, said vertical pipe mounting therein a float having a specific gravity selected such that the float is located in the liquid-to-liquid interface formed by a driving liquid and an intermediate liquid in the vertical pipe at all times and moves in elevational movement therein as the liquid-to-liquid interface shifts its position, to keep the driving liquid and the intermediate liquid from mixing with each other;
   high-pressure driving liquid feed means fluidly connected to the other end of said vertical pipe through a valve;
   a driving liquid return pipe fluidly connected at one end thereof to said other end of said vertical pipe through a valve, said driving liquid return pipe being connected at the other end thereof to said high pressure driving liquid feed means; and
   means for sealing therein said intermediate liquid having a specific gravity higher than that of said driving liquid and lower than that of said mixture, said intermediate liquid sealing means being located in a lower portion of said vertical pipe and in a portion of said horizontal feed pipe disposed near the connection between the vertical pipe and the horizontal feed pipe.

2. An apparatus for hydraulically transporting particulate solid material as set forth in claim 1, wherein said intermediate liquid sealing means comprises intermediate liquid feed means fluidly connected through a valve to one of said one end and said other end of said horizontal feed pipe.

3. An apparatus for hydraulically transporting particulate solid material as set forth in claim 1, wherein said low-pressure mixture feed means comprises a low-pressure mixture pump, and said intermediate liquid sealing means comprises an intermediate liquid tank fluidly connected through a valve to the suction side of said low-pressure mixture pump.

4. An apparatus for hydraulically transporting particulate solid material as set forth in claim 1, wherein said low-pressure mixture feed means comprises a low-pressure mixture pump having rotatably connected thereto a suction pipe opening at its free end in a tank containing the mixture and the intermediate liquid.

5. An apparatus for hydraulically transporting particulate solid material as set forth in claim 1, wherein said low-pressure mixture feed means comprises a low-pressure mixture pump and a mixture tank, and said intermediate liquid sealing means comprises an intermediate liquid tank and a movable pipe connected at one end thereof to said intermediate liquid tank, said low-pressure mixture pump being fluidly connected to one end of a suction pipe opening at the other end in said mixture tank and said movable pipe being detachably connected at the other end thereof to said the other end of said suction pipe in said mixture tank.

* * * * *